United States Patent [19]

Engelhardt et al.

[11] Patent Number: 5,002,088
[45] Date of Patent: Mar. 26, 1991

[54] CLEAN-IN-PLACE PRESSURE AND VACUUM RELIEF VALVE

[75] Inventors: Bill Engelhardt, Broken Arrow; Charles D. Brown, Tulsa, both of Okla.

[73] Assignee: Oseco Valve and Service Company, Inc., Broken Arrow, Okla.

[21] Appl. No.: 405,874

[22] Filed: Aug. 30, 1989

[51] Int. Cl.⁵ ............................................. F16K 17/196
[52] U.S. Cl. ................................ 137/493.1; 137/493.6; 137/522
[58] Field of Search ............... 137/493.1, 493.6, 493.8, 137/493.9, 522, 495, 523; 251/63.4

[56] References Cited

U.S. PATENT DOCUMENTS 2,987,073  6/1961  Hughes ............................ 137/522 X
4,705,065  11/1987  McNeely et al. .............. 251/63.4 X

FOREIGN PATENT DOCUMENTS 326823  2/1958  Switzerland ..................... 137/493.9
19604  of 1913  United Kingdom ............. 137/493.9

Primary Examiner—Stephen M. Hepperle
Attorney, Agent, or Firm—Pravel, Gambrell, Hewitt, Kimball & Krieger

[57] ABSTRACT

A clean in place or sterilize in place valve includes both over pressure and vacuum protection. The apparatus can be remotely operated and monitored to assure that the valve did or will function correctly. The valve housing has a bore that communicates with a vessel. The bore is valved with separately movable pressure valving and vacuum valving members, each separately adjustably set at desired positive/negative pressure valve settings. The vacuum release can be operated independently of the pressure release.

20 Claims, 4 Drawing Sheets

CLEAN-IN-PLACE PRESSURE AND VACUUM RELIEF VALVE

BACKGROUND OF THE INVENTION

1. Field of the Invention

The present invention relates to an improved pressure/vacuum relief valve apparatus and more particularly relates to a valve apparatus which can relieve a vessel to which it is affixed of either pressure or vacuum therewithin. Even more particularly the present invention relates to an improved adjustable relief valve apparatus (pressure or vacuum relief) that can be cleaned in place using remote instrumentation.

2. General Background

In the industry of beverage, bio-engineering, pharmaceutical, cosmetics and food processing, control of bacteria is one of the most important features of any equipment used. The equipment must function to the maximum design capabilities and also be easily cleaned to eliminate and prevent the accumulation and build-up of food, dried liquid or the like that can function as a medium for growth of harmful bacteria and other such microorganisms.

In the processing of some food and beverage products (e.g. beer), pressure is produced as a by-product of the process. Containing and controlling gaseous by-products is very important to producing the quality and maintaining the desirable characteristics of the final product. For example, in the fermentation process of beer, carbon dioxide is produced and must be contained for further use in the aging process of the beer.

A very important piece of equipment used in food/beverage processing is an over-pressure relief device known as a safety relief valve. Certain conditions can also exist that result in a vacuum being present in the system. In these applications a combination pressure and vacuum relief valve is used to satisfy both conditions. The problem that exists with such valve devices in use today for over-pressure and vacuum relief, is that these prior art devices do not clean themselves i.e., permit in-place cleaning or sterilization, or remote operations. The food uses sugar and other ingredients in the processing to the final product. During some food processing ingredients can collect in crevices and corners As aforementioned, these ingredients can solidify and become a breeding place for harmful bacteria. However, the solidification of ingredients can create another significant problem that can render the over-pressure/vacuum relief equipment inoperable when the liquids solidify, adhering the working parts together. This potentially creates a very dangerous and unreliable condition that may result in a damage or loss of very expensive equipment and product. Even worse is the possible injury or loss of life for personnel working in the area of such vessels.

Several patents have been granted for valves which operate to relieve pressure and/or vacuum. Even some of these valves relieve both pressure and vacuum in the same apparatus. Examples of relief valve can be seen in the following patents.

| U.S. Pat. No. | TITLE | INVENTOR |
| --- | --- | --- |
| 4,091,837 | FREEZERPROOF BREATHER VALVE | EDMUNDS |
| 4,016,903 | PILOT OPERATED PRESSURE AND VACUUM RELIEF VALVE | AKASHI |
| 3,100,503 | PILOT OPERATED PRESSURE AND VACUUM RELIEF VALVE | TENNIS |
| 4,323,096 | COMBINATION VACUUM RELIEF VALVE AND PRESSURE RELIEF VALVE WHICH ARE PROTECTED FROM THE ATMOSPHERE | DUGGE |
| 2,989,072 | RELIEF VALVE FOR HIGH PRESSURES | BANKER |
| 3,441,050 | PRESSURE EQUALIZING VALVE | SANCHEZ |
| 1,990,371 | COMBINED VACUUM AND RELIEF VALVE | CHADWICK |
| 725,782 | DOUBLE ACTING VALVE FOR BEER VATS | SCHMAHL & ZIMMERMAN |

An early patent showing a double acting valve for a beer vat is shown in U.S. Pat. No. 725,782 entitled "Double Acting Valve For Beer Vats". In column 1, line 16 and following, the '782 patent discusses the problem of allowing air to be drawn into the vat when beer is drawn from the lower end thereof and in order to vent gas pressure discharged through the valve when that pressure exceeds a certain value.

The Chadwick U.S. Pat. No. 1,990,371 discloses another early version of a combined vacuum and relief valve apparatus. Other examples of early pressure equalizing valves can be seen in the Banker U.S. Pat. Nos. 2,989,072 and in the Sanchez 3,441,050.

The concept of using a pilot to operate pressure and relief valves can be seen in the U.S. Pat. Nos. 3,100,503 to Tennis and 4,016,903 to Akashi also discloses the concept of double acting relief valves.

The Crosby valve division of Moorco of Wrenthamas, Massachusetts manufactures a pressure vacuum relief valve known by its designation "Crosby PVR". The valve includes a body having a pressure relief disc and a vacuum disc. Springs are provided for biasing the pressure relief disc and the vacuum disc with certain load values.

SUMMARY OF THE PRESENT INVENTION

The present invention provides an improved pressure/vacuum relief valve which can be cleaned in place. The present invention also provides a valve construction which can be sterilized in place on a process vessel. The valve apparatus of the present invention is designed to permit in place cleaning and sterilization, and also give positive over pressure and vacuum protection. In addition, the apparatus of the present invention can be remotely operated and monitored to assure that the valve did or will function correctly. The present invention provides an improved relief valve construction that can prevent collection and buildup of fluids, food, media, microorganisms or the like by having the fluids drain internally at a predetermined time. Any external washing of tanks or valves will result in fluids being drain away.

The value of the present invention includes an improved configuration that can be operated by remote control to insure that the valve is always functional and clean of accumulated media allowing for timely and regular cleaning and sterilization. The valve release can be operated independently of the pressure release should pressure or vacuum decompression be needed.

The present invention provides an adjustable clean-in-place relief valve apparatus for valving a vessel to relieve pressure or vacuum therefrom. The apparatus includes a valve body having an internal bore, and a first port in the body for communicating fluid flow between the bore and the vessel, and a second port in the body for venting the vessel via the bore. A first valve stem portion carries a valving member for valving excess pressure from the vessel via the bore. A second valving member carried by a second valve stem portion can relieve excess vacuum within the vessel. A pressure seat is formed between the valve body and the first valving member and a vacuum seat is provided forming seat between the valve body and the second valving member. An adjustment spring varies the pressure level at which the first valving member. A second smaller and internally positioned spring varies the vacuum level at which the second valving member will open. A fluid operated release can selectively unseat at least one of the valving means from its respective seat. In the preferred embodiment, the fluid operated means includes a fluid operator attached to an end portion of the valve stem, which can be used to move the stem in either of two separate directions. Either of two separate stem directional movements results respectively in either an unseating of the pressure or of the vacuum valving member.

The valve apparatus can have a flange or like mounting member surrounding the first port for affixing the housing to a process vessel, such as a beer vat.

In the preferred embodiment, the first and second stem portions are carried by a single common valve stem.

In the preferred embodiment, the second port extends laterally from the bore.

In the preferred embodiment, the bore is cylindrical having a central axis and a second port extends laterally with respect to the central axis of the bore.

In the preferred embodiment, the first and second adjustment springs are concentrically spaced apart coil springs, including a larger outer spring for controlling pressure and a smaller inner spring for controlling vacuum.

In the preferred embodiment, the first valving member is an annular member having a central flow bore therethrough.

In the preferred embodiment, the annular member and the second valving member are correspondingly shaped, being preferably rounded so that the second valving member seats upon the annular member.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
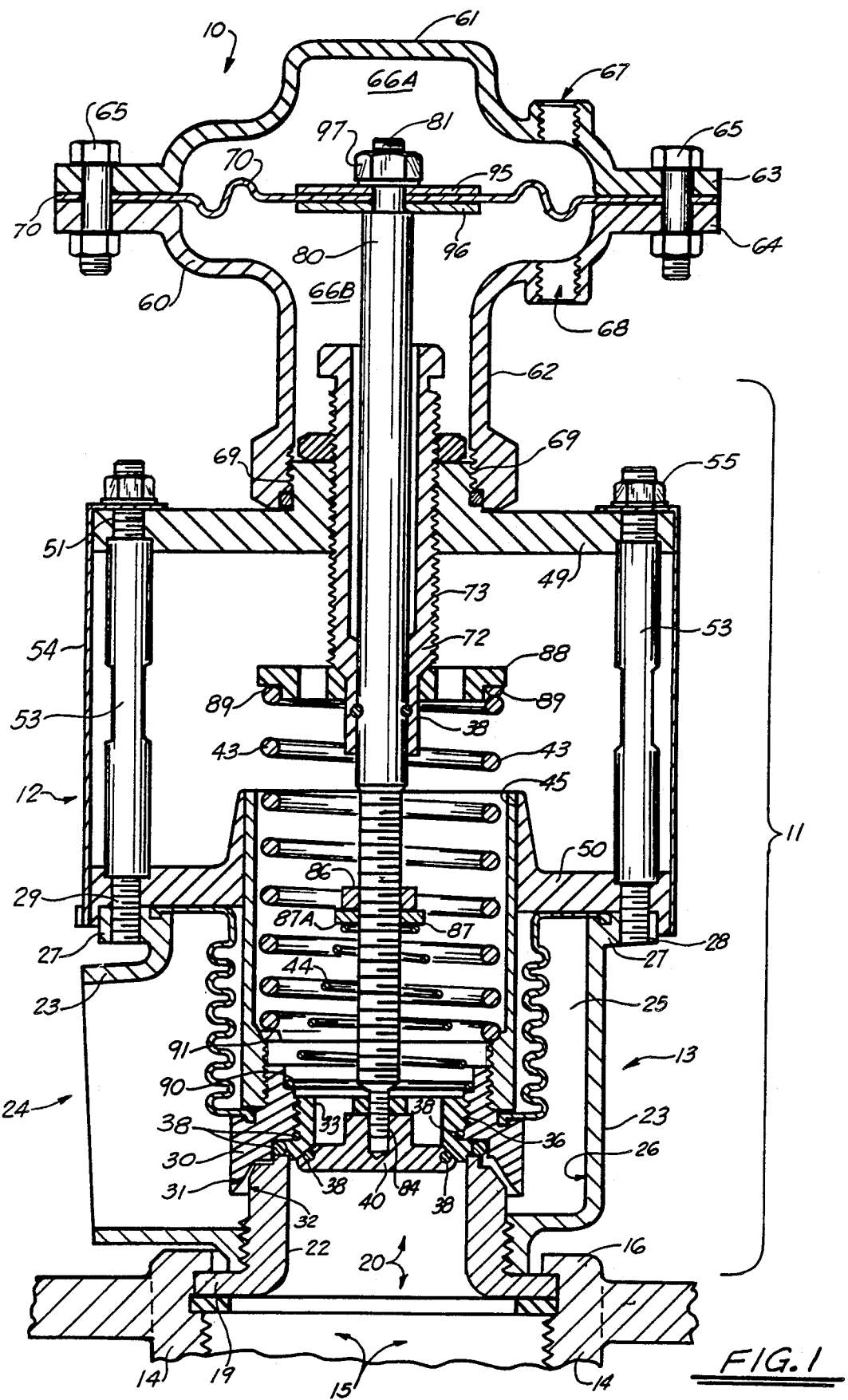
FIG. 1 is an exploded sectional view illustrating the preferred embodiment of the apparatus of the present invention.

FIGS. 1-4 illustrate the preferred embodiment of the apparatus of the apparatus of the present invention designated generally by the numeral 10.

Valve apparatus 10 includes a housing 11 having an upper housing portion 12 and lower housing portion 13 which includes annular base 18 having inner bore 20. A vessel 14 is partially shown with valve 10 thereto. The vessel 14 with an interior 15 can be a large vessel or tank, e.g. a food processing vessel such as a beer vat, as an example. However, it should be understood that the valve 10 of the present invention has application to numerous process vessels wherein both relief from vacuum and from excess pressure is required.

Nozzle 19 extends circumferentially from the lowermost portion 13 of the valve housing 11. A gasket ring 17 and hammer union nut 16 of vessel 14 of hold the valve 10 in position at annular base 18 upon vessel 14. Hammer union nut 16 is held in place by skirt 19. Nut 16 spins free allowing it to be made up with the vessel 15.

Skirt 19 has an inner wall 22 that extends circumferentially about bore 20. Bore 20 is preferably cylindrical and provides a means of communicating fluid (i.e. excess fluid pressure relief) from the vessel 14 interior 15 to the atmosphere, or for allowing air to enter the vessel 14 interior to relieve excess vacuum accumulated within the vessel.

External threads 21 are provided in inner wall 26 of housing lower portion 13. Shroud 23 extends circumferentially defining an annular space 25 that channels fluid to lateral outlet port 24, which defines a transverse port for communicating with bore 20. The bore 20 has a lower open end portion that defines a downwardly extending port through which fluid can flow between the valve 10 and vessel 14 interior 15.

During operation, excess pressure contained within vessel 14 interior is relieved and discharges via lateral outlet port 24. In order to relieve pressure, valving member 30 rises from its sealing position upon base 18. Excess vacuum is relieved at vacuum valving member 40 which moves downwardly so that fluid can pass between valving member 40 and annular vacuum seat member 33. Adjustable coil spring 43 regulates the relief pressure value while adjustable coil spring 44 regulates vacuum pressure relief value.

Shroud 23 has an upper annular flanged portion 27 provided with a plurality of bolt holes 28, having internal threaded portions receptive of bolt threads 29. This allows the lower 13 portion of valve housing 11 to be connected to the upper 12 portion of valve housing at plate 49.

The lower 13 portion of valve housing 11 thus includes two valving members. Pressure valving member 30 opens to relieve excess pressure contained within vessel 14 interior 15. Vacuum valving member 40 opens to allow fluid to flow via bore 20 into vessel 14 interior 15 for relieving vacuum within vessel interior 15.

Pressure valving member 30 is an annular member having a lower beveled annular surface 31 that communicates with and registers upon the annular upper beveled surface 32 of base 18. Valving member 30 is threadably connected to inner annular vacuum seat member 33 at threaded connection 36. Base 18 also includes an inner annular surface 34 that registers with and cooperates with an outer annular surface 35 of member 33 forming a seal therewith. The mating beveled surfaces 34, 35 of the respective members 33, 18 thus define a valve seat for valving pressure relief. Pressure valving member& 30 forms a threaded connection 37 with sleeve 45. When excess pressure is to be relieved, both valving member 30 and sleeve 45 slide upwardly.

In order to help perfect a seal for both pressure relief and vacuum relief, annular seal members 38 are positioned at the valve seat areas and at threaded connections as shown in FIG. 1. An annular seal member 38 is placed upon vacuum valving member 40 at the beveled valving surface 41 thereof which forms a seal with annular beveled surface 42. An annular seal ring 38 is placed atop base 18 while an annular seal member 38 is positioned between valving member 30 and annular member 33. Bellows 46 is provided for covering the connection between sleeve 45 and upper housing base plate 50.

Upper housing 12 includes a pair of spaced apart plates 49, 50. Each plate 49, 50 includes a plurality of threaded openings 51, 52 respectively receptive of assembly bolts 53. An annular sidewall 54 can form an external cover to keep out water. The configuration of cover 54 can be of any shape in order to protectively keep out water. Nuts 55 attach to bolts 53, in order to complete assembly of plates 49, 50.

Mounted atop upper housing 12 is bonnet 60, comprised of upper bonnet section 61 and lower bonnet section 62. Upper and lower sections 61, 62 include peripheral flange portions 63, 64 which can be assembled by means of a plurality of bolted connection 65. Sandwiched between flanged portions 63, 64 is a flexible diaphragm 70 having the centermost portion thereof communicating with upper and bonnet interior 66 chambers 66A, 66B. Each bonnet section 61, 62 is provided with an instrumentation port 67, 68 respectively for adding operating fluid thereto. The lower bonnet portion 62 forms a threaded connection 69 with upper plate 49. O-ring seal member 38 positioned between stem 80 and sleeve 72 contains remote operating pressure within chamber 66B above seal member 38 and plate 96.

Figure 2:
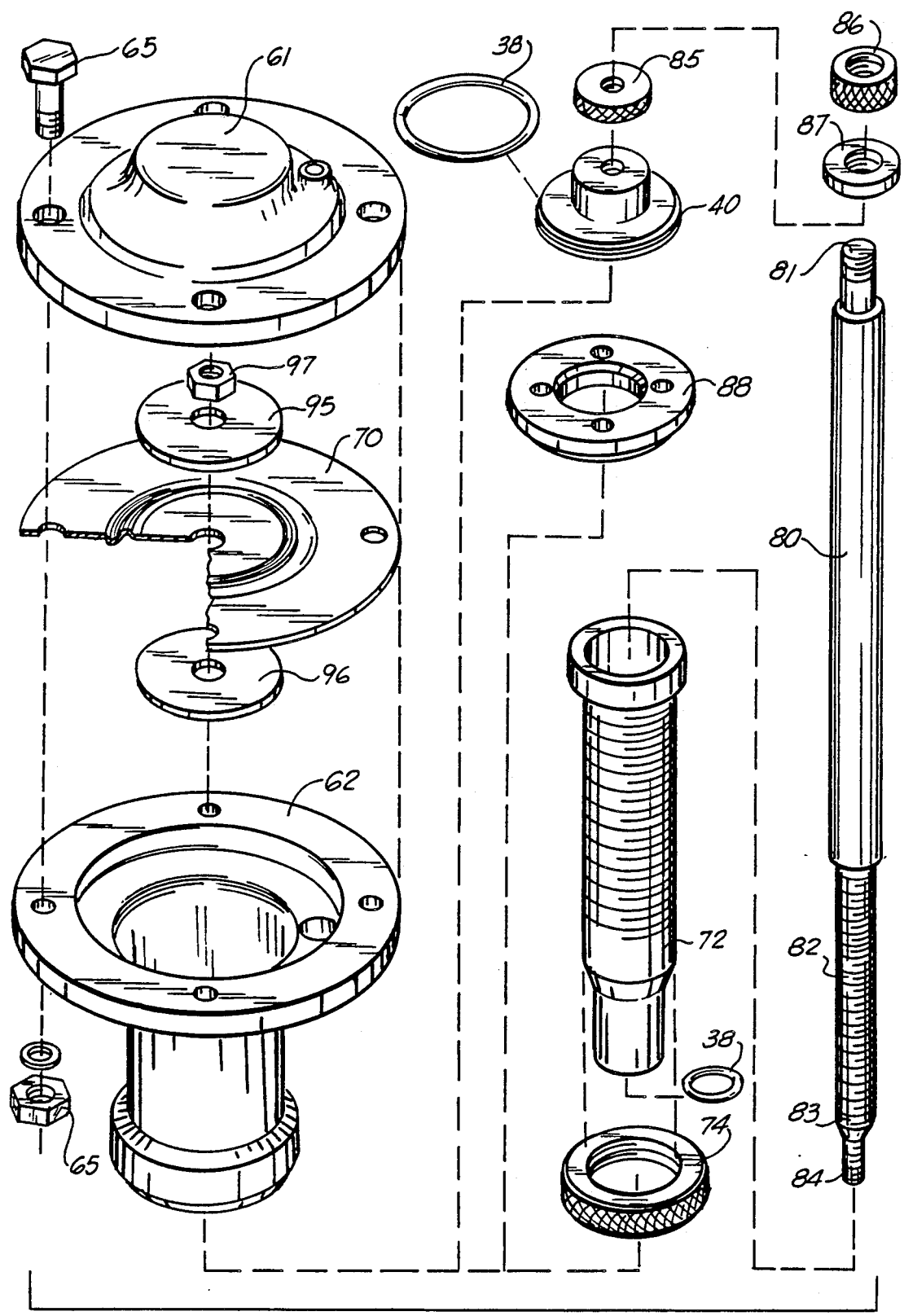
FIG. 2 is an exploded perspective view illustrating the preferred embodiment of the apparatus of the present invention.
Figure 3:
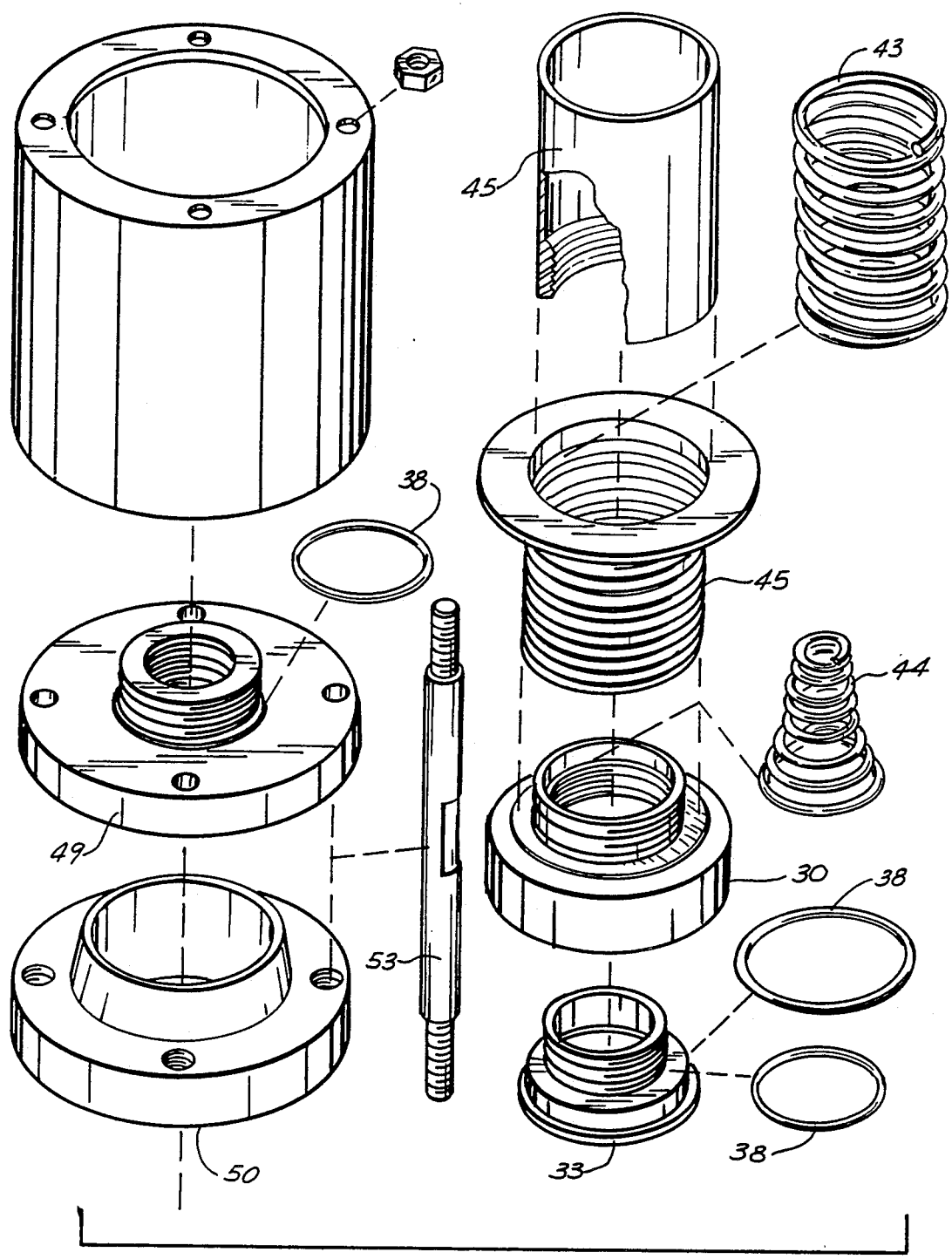
FIG. 3 is another exploded perspective view illustrating the preferred embodiment of the apparatus of the present invention.
Figure 4:
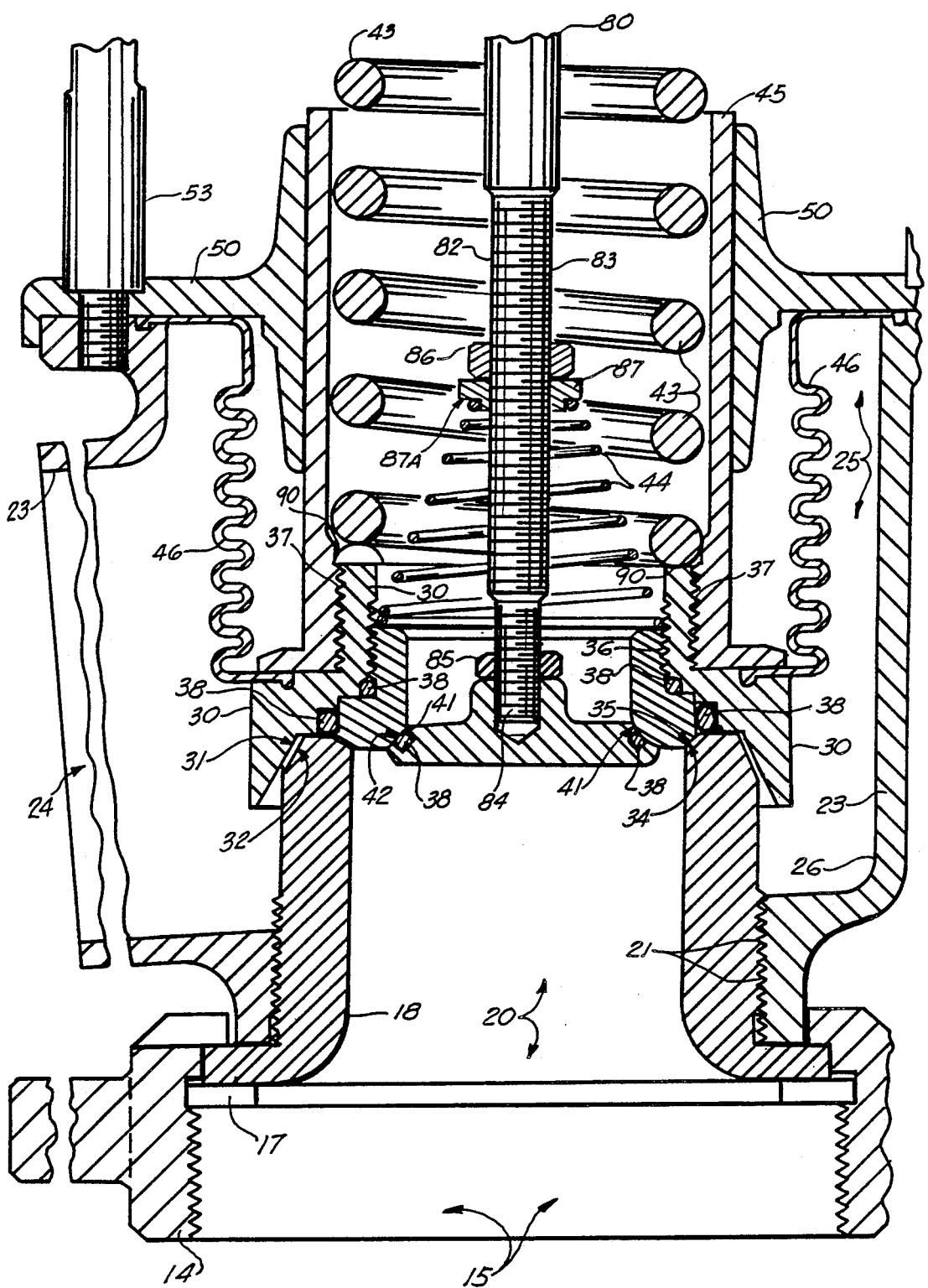
FIG. 4 is a fragmentary sectional elevational view illustrating the lower valve housing portion of the preferred embodiment of the apparatus of the present invention.

Plate 49 includes a threaded opening 71 to which elongated threaded sleeve 72 attaches. Sleeve 72 includes an external threaded portion 73 which allows the sleeve 72 to move upwardly and downwardly upon rotation, as it engages the threads of opening 71. A lock nut 74 can be tightened to affix the elevational position of sleeve 72. Sleeve 72 has a central vertical bore that carries elongated valve stem 80, having upper 81 and lower 82 end portions. The lower 82 end portion is threaded and includes a larger diameter threaded section 83 and a smaller diameter of threaded section 84 which mates with a threaded aperature provided in the top of vacuum valving member 40 as best seen in FIGS. 1 and 2. A lock nut 85 affixes vacuum valving member 40 stem 80.

The threaded 83 portion stem 80 includes an annular adjustment nut 86 abutting flange plate 87 that has an annular shoulder 87A which is receptive of the upper end portion of coil spring 44. Sleeve 72 carries annular plate 88 having an annular shoulder 89 which is receptive of the upper end portion of coil spring 43. The lowermost end portion of coil spring 44 registers upon an annular shoulder 90 provided upon pressure valving member 30. Sleeve 45 includes an annular shoulder 91 which, in combination with valve member 30, carries the lower end portion of coil spring 43.

By adjusting the position of sleeve 72 upwardly and downwardly, the distance between annular shoulder 89 and valving member 30 is varied so that the tension upon coil spring 43 can be increased or decreased. Thus, an adjustability is provided for the pressure relief value at which valve 10 will relieve pressure contained within vessel 14 interior 15.

Similarly, the upward and downward movement of adjustment nut 86 and flange 87 upon threaded portion 83 varies the distance between annular shoulder 87A and shoulder 90 (and thus length of spring 44), thus varying the compressive force upon coil spring 44 providing an adjustability to the value at which vacuum relief occurs for valve 10.

The apparatus 10 of the present invention includes a self-cleaning feature using bonnet 60. Diaphragm 70 is connected to stem 80 for movement therewith. A pair of upper and lower assembly flanges 95, 96 are placed upon and below diaphragm 70 and held in position with assembly nut 97 which threadably attaches to the upper end 81 of stem 80. While introducing fluid into bonnet interior 66 above diaphragm 70 (i.e. upper interior 66A), the diaphragm 70 expands downwardly pushing valve stem 80 downwardly and thus releasing vacuum valving member 40 from seat member 33. Similarly, introducing pressurized fluid into port 68 and lower interior 66B causes diaphragm 70 to move upwardly and carry stem 80 therewith lifting valving member 30 from its sealing position upon base 18. The vacuum 40 and pressure 30 valving members can be removed from their respective seats for cleaning purposes without removal of the valve 10 by simply moving stem 80 upwardly or downwardly during cleansing.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An adjustable clean-in-place relief valve apparatus for valving a vessel to relieve pressure or vacuum therefrom comprising:
    (a) a valve housing having an internal bore and a first port in the housing for communicating fluid flow between the bore and the vessel, and a second port in the housing for venting the vessel via the bore;
    (b) a valve stem assembly;
    (c) a first valving member carried by the valve stem assembly, for valving excess pressure from the vessel via the bore;
    (d) a second valving member carried by the valve stem assembly for relieving excess vacuum within the vessel
    (e) pressure seat means for forming a seat between the valve housing and the first valving member;

(f) vacuum seat means for forming a seat between the valve housing and the second valving member;

(g) first adjustment means for varying the pressure level at which the first valving member will open;

(h) second adjusting means for varying the vacuum level at which the second valving member will open;

(i) fluid operating means for selectively unseating at least one of the valving members from its seat using remote instrumentation.

2. The valve apparatus of claim 1 further comprising a flange surrounding the first port for affixing the housing to the vessel.

3. The valve apparatus of claim 1 wherein the second port extends laterally from the bore.

4. The valve apparatus of claim 3 wherein the bore is cylindrical having a central axis and the second port extends laterally with respect to the bore central axis.

5. The valve apparatus of claim 1 wherein the first and second adjustment means are first and second concentrically spaced coil springs.

6. The valve apparatus of claim 5 wherein each coil spring is affixed at one end portion to the valve stem assembly.

7. The valve apparatus of claim 1 wherein the first and second valving members are positioned adjacent the first port in the housing and the first valving member carries the vacuum seat means.

8. The valve apparatus of claim 1 wherein the second valving member is attached to an end of the stem assembly that is positioned adjacent the first port.

9. The valve apparatus of claim 1 wherein the first valving member is an annular member having a central flow bore therethrough.

10. The valve apparatus of claim 9 wherein the annular member and the second valving member are correspondingly shaped.

11. The valve apparatus of claim 10 wherein the annular member and the second valving member are generally rounded in shape.

12. The valve apparatus of claim 1 wherein the first valving member, second valving member each have corresponding beveled annular portions that define the vacuum seat means.

13. The apparatus of claim 1 wherein the first valving member includes first and second portions including an inner portion carrying the vacuum seat means and an outer portion carrying the pressure seat means.

14. The apparatus of claim 1 wherein the first and second adjustment means include a pair of concentrically positioned springs and a transverse follower plate mounted upon the valve stem, the follower plate carrying at one end portion thereof the first adjustment means, and the opposite end portion of the first adjustment means being positioned to bear against the outer portion of the first valving member.

15. The apparatus of claim 1 wherein the housing includes upper and lower portions including a lower portion that communicates with the second port and an upper portion separated from the first portion by a transverse plate.

16. The apparatus of claim 14 further comprising an upper section of the valve housing that communicates with an end portion of the valve stem assembly spaced from the first and second valving members.

17. The apparatus of claim 1 wherein the fluid operated means includes means attached to one end portion of the valve stem for moving the stem upwardly and downwardly with respect to the housing by the application of fluid force to the third section of the housing.

18. The apparatus of claim 17 wherein the fluid operated means comprises in part a flexible membrane attached to the stem and extending laterally to the valve housing, and first and second instrumentation openings mounted respectively on opposite sides of the membrane so that the membrane divides the upper section of the housing into upper and lower instrumentation sections and wherein application of fluid respectively to the first and second instrumentation ports causes the valve stem to move upwardly or downwardly.

19. An adjustable clean-in-place relieve valve apparatus for valving a vessel to relieve pressure or vacuum therefrom comprising:

(a) a valve housing having an internal bore and a first port in the housing for communicating fluid flow between the bore and the vessel, and a second port in the housing for venting the vessel via the bore;

(b) a first valving member for valving excess pressure from the vessel via the bore;

(c) a second valving member for relieving excess pressure within the vessel;

(d) stem means for slidably moving the first and the second valving members with respect to the valve housing;

(e) pressure seat means for forming a seat between the valve housing and the first valving member;

(f) vacuum seat means for forming a seat between the valve housing and the second valving member;

(g) first adjustment means for varying the pressure level at which the first valving member will open;

(h) second adjustment means for varying the vacuum level at which the second valving member will open;

(i) fluid operated means for selectably unseating at least one of the valving members from its seat using remote instrumentation.

20. The valve apparatus of claim 19 wherein the fluid operated means comprises a valve bonnet, and a membrane carried within the valve bonnet and attached to the stem means, and instrumentation ports for selectively adding fluid under pressure to the bonnet on one side of the membrane in order to unseat at least one of the valving members as selected, from its seat using remote instrumentation.

* * * * *